Patented Sept. 1, 1931

1,821,106

UNITED STATES PATENT OFFICE

EDWARD MILANI, OF SAN FRANCISCO, CALIFORNIA

METHOD OF PRESERVING FOOD PRODUCTS

No Drawing.  Application filed January 12, 1925. Serial No. 1,925.

The present invention relates to the method of preserving food products, particularly fresh foods such as fresh fruits, vegetables and the like in an uncooked or non-sterilized condition.

This invention like the subject matter of my issued Patent No. 1459232, dated June 19th, 1923, has for its principal object to enable fresh fruits, vegetables and the like to be put up and preserved within a sealed container in fresh or ripened condition and in such condition shipped to distant points or maintained in storage for subsequent use for a period of a considerable length of time.

The invention consists primarily in treating the food product with inert gas and hermetically sealing the same within a container for a predetermined period, until the action of the gas has destroyed all germ life within the food product, after which time the container is vented, which precludes the food product from becoming unfit for use, due to its contamination by absorbing the inert gas or a gas generated by the food when hermetically sealed.

I have discovered in experimenting with the preservation of fruit and fresh food products, that the food product can be maintained for a limited length of time hermetically sealed within a container in the presence of an inert gas, but that after a certain length of time, dependent on the fresh food product preserved, the product itself generates gas within the container and if the product is left after giving off this gas for too long a period within the closed container, this gas intermixes with the preserving gas and they permeate the food product destroying its quality and flavor.

In my experiments, I have discovered that food products treated as above, which inert gas treatment within a hermetically sealed container undoubtedly destroys the germ life in the product, can be maintained in their original condition if the container is vented to the atmosphere prior to the food product generating its own gas; therefore it is this method that I am protecting in the present application.

In carrying out my method invention I deposit within any suitable form of container after being freed of all foreign material, the food product, preferably ripened, to be preserved. The container with its food product therein is then preferably treated as set forth in United States Letters Patent No. 1459232, dated June 19th, 1923, or is deposited or positioned within a chamber of the well known type, wherein the oxygen contained within the container and product is exhausted and carbon dioxide or other inert gas is substituted. The container is hermetically sealed prior to leaving this chamber and the product contained therein is precluded from decaying and is maintained desirable for consumption for a considerable length of time.

Depending on the product contained within the container, the particular product controlling the length of time during which the container is maintained hermetically sealed, some products generating a gas after twelve days and other products generating a gas after fifteen days, I vent the container by puncturing its wall near one end, preferably at its upper end, at a single place, by the use of an instrument of exceedingly small diameter and relieve the gas pressure therein generated by the hermetically sealed fruit, if any exists. I have discovered that while the food is perfectly preserved it will begin to absorb the product of the gas generated by the fruit and the inert gas at the end of the twelfth or fifteenth day of its preservation, but if the container is vented at this time its contents may be maintained in an excellent state of preservation for an additional period of from three to four months without absorbing the odor of any gas which may collect within the container.

The packed product may be kept cool as stated in my said patent when prolonged storage is contemplated.

The gases generated by the food product within the hermetically sealed container may, under certain conditions, be automatically vented therefrom after attaining a predetermined pressure by the provision of an automatic vent which when once operated will remain open; this, however, forms no part of the present invention, as this present invention relates to the method of storing fresh food products against deterioration in any suitable type of container.

I claim:—

1. The method of storing fresh fruit and vegetable food products against normal deterioration which consists in depositing the same within a container, drawing a vacuum within the container, admitting an inert gas into the container, sealing the container with the gas contained therein against the admission of the outside air and permitting the product to remain therein until about the time when the same generates a gas within the container, and then puncturing the wall of the container to release the generated gas contained therein and permitting said puncture to remain open.

2. The method of storing fresh fruit and vegetable food products against normal deterioration which consists in depositing the same within a container, drawing a vacuum within the container, admitting an inert gas into the container, sealing the container with the gas contained therein against the admission of the outside air and permitting the product to remain therein until about the time when the same generates a gas within the container, and then puncturing the wall of the container to release the generated gas contained therein and permitting said puncture to remain open, and keeping cool the packed product.

In testimony whereof I have signed my name to this specification.

EDWARD MILANI.